United States Patent
Dooley et al.

(10) Patent No.: US 7,570,272 B2
(45) Date of Patent: Aug. 4, 2009

(54) METHOD OF GENERATING A MAP DISPLAY FOR A GRAPHICAL USER INTERFACE

(75) Inventors: Saul R. Dooley, Horley (GB); Andrew T. Yule, East Grinstead (GB)

(73) Assignee: Geotate B.V., Eindhoven (NL)

( * ) Notice: Subject to any disclaimer, the term of this patent is extended or adjusted under 35 U.S.C. 154(b) by 53 days.

(21) Appl. No.: 10/563,650

(22) PCT Filed: Jul. 2, 2004

(86) PCT No.: PCT/IB2004/002236

§ 371 (c)(1),
(2), (4) Date: Jan. 6, 2006

(87) PCT Pub. No.: WO2005/006258

PCT Pub. Date: Jan. 20, 2005

(65) Prior Publication Data

US 2006/0167627 A1    Jul. 27, 2006

(30) Foreign Application Priority Data

Jul. 10, 2003    (GB)    ................................ 0316168.4

(51) Int. Cl.
*G09G 5/00*    (2006.01)
*G06T 11/20*    (2006.01)
*H04H 24/00*    (2006.01)
*G08G 1/123*    (2006.01)

(52) U.S. Cl. .................... 345/629; 345/440; 455/456.1; 340/995.1

(58) Field of Classification Search .............. 455/456.5, 455/456.1; 345/629, 440; 340/995.1
See application file for complete search history.

(56) References Cited

U.S. PATENT DOCUMENTS

2004/0266457 A1*   12/2004   Dupray .................... 455/456.5

OTHER PUBLICATIONS

Yost et al., "Comments on Circular vs. Elliptical Errors in Automatic Location Identification"; IEEE, 1998, pp. 673-678.*

* cited by examiner

*Primary Examiner*—Ryan R Yang
(74) *Attorney, Agent, or Firm*—Blakely, Sokoloff, Taylor & Zafman

(57) ABSTRACT

A method of generating a map display for a graphical user interface (GUI) comprising the steps of displaying a map, highlighting a first area on the map surrounding a first position fix wherein the size of the area corresponds to the accuracy of the first position fix and highlighting a second area on the map surrounding a second position fix wherein the size of the second area corresponds to the accuracy of the second position fix. Either (a) when the first and second areas overlap, either (i) the one corresponding to the most recent or accurate position fix is displayed on top of the other or (ii) the highlighting of the overlapping area is different from that of those parts of the first and second areas which do not overlap, or (b) the manner in which at least one of the position fixes is obtained is indicated by the color of the highlight. The area highlighted on the map surrounding the position fix may be a shape other than a circle.

6 Claims, 2 Drawing Sheets

METHOD OF GENERATING A MAP DISPLAY FOR A GRAPHICAL USER INTERFACE

This invention relates to a method of generating a map display for a graphical user interface (GUI) and to a computer program, a computer-readable storage medium, server and apparatus for the same. In particular, the invention relates to such a method comprising the steps of displaying a map and highlighting an area on the map surrounding a position fix wherein the size of the area corresponds to the accuracy of the position fix.

Japanese patent application, publication number 64-026177 discloses a "measured position display device" which displays a circle about a measured position whose radius corresponds to the measured position accuracy.

In accordance with the present invention, a method of generating a map display of the aforementioned type is provided further comprising the step of highlighting a second area on the map surrounding a second position fix wherein the size of the second area corresponds to the accuracy of the second position fix wherein either (a) when the first and second areas overlap, either (i) the one corresponding to the most recent or accurate position fix is displayed on top of the other or (ii) the highlighting of the overlapping area is different from that of those parts of the first and second areas which do not overlap, or (b) the manner in which at least one of the position fixes is obtained is indicated by the colour of the highlight.

Further provided in accordance with the present invention is a method of generating a map display of the aforementioned type wherein the area highlighted on the map surrounding the position fix is a shape other than a circle.

Yet further provided in accordance with the present invention is a computer-readable storage medium, server and computer for the same as claimed.

Figure 1:
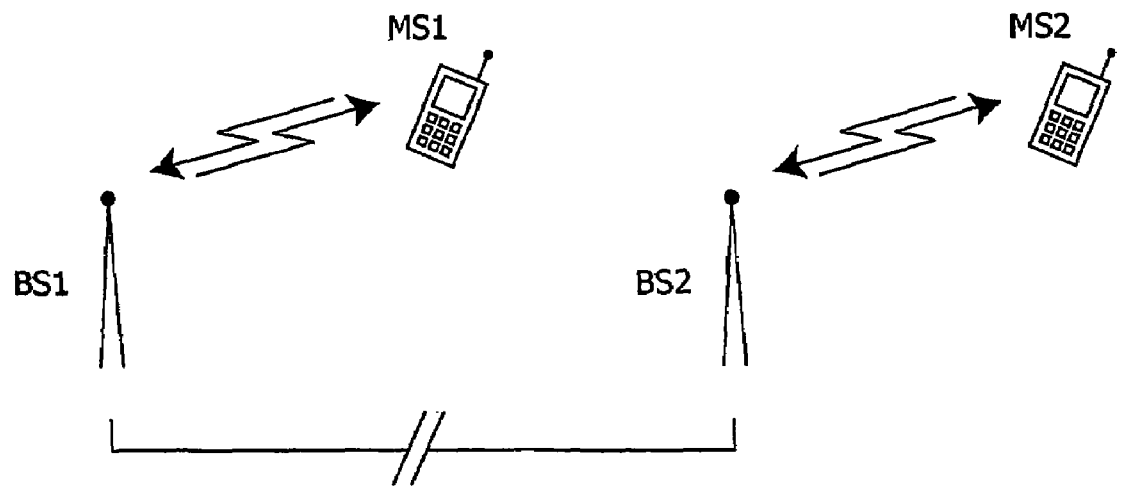
Figure 2:
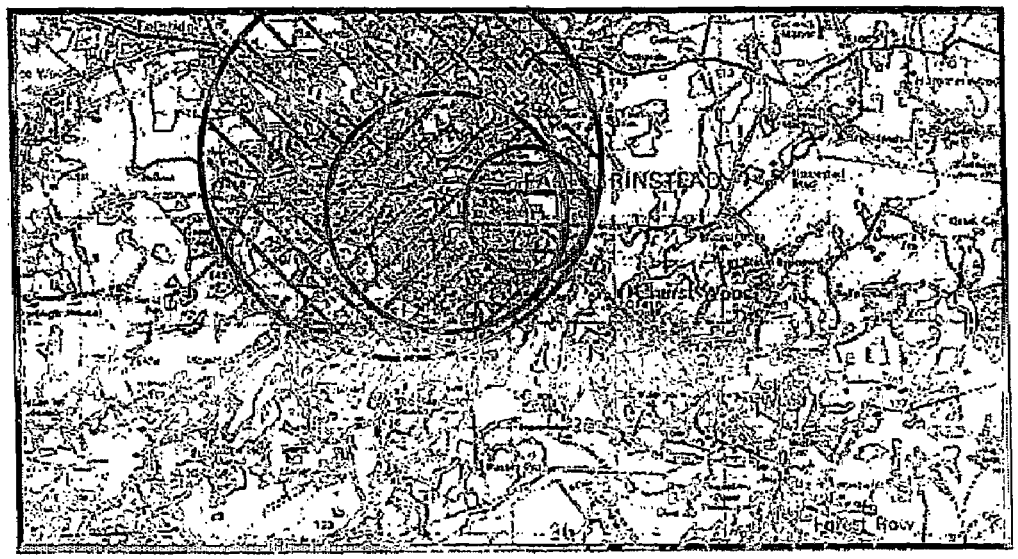
Figure 3:
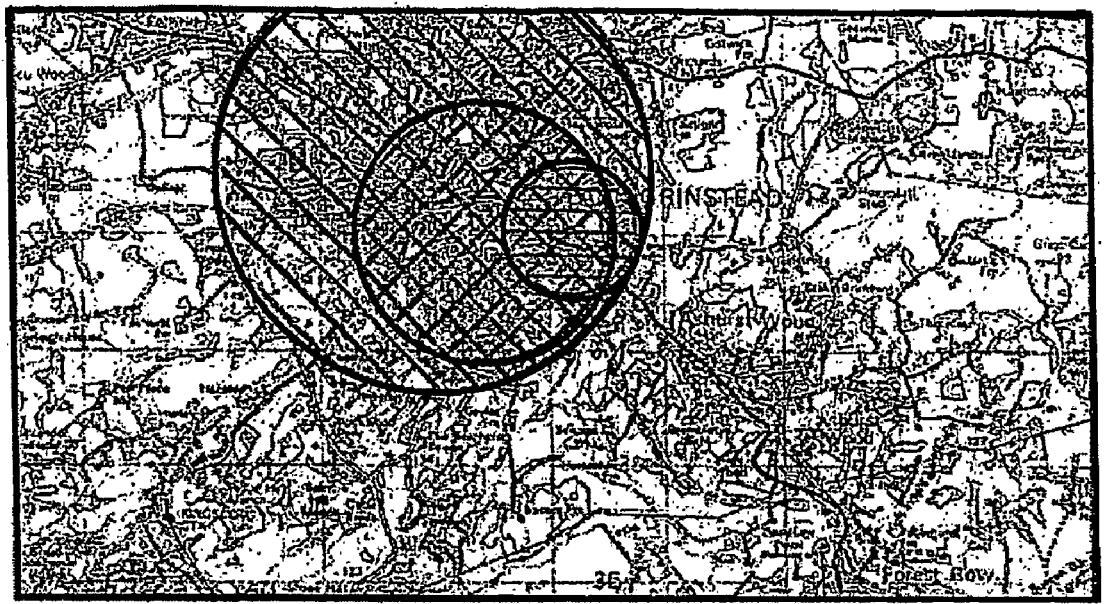
Figure 4:
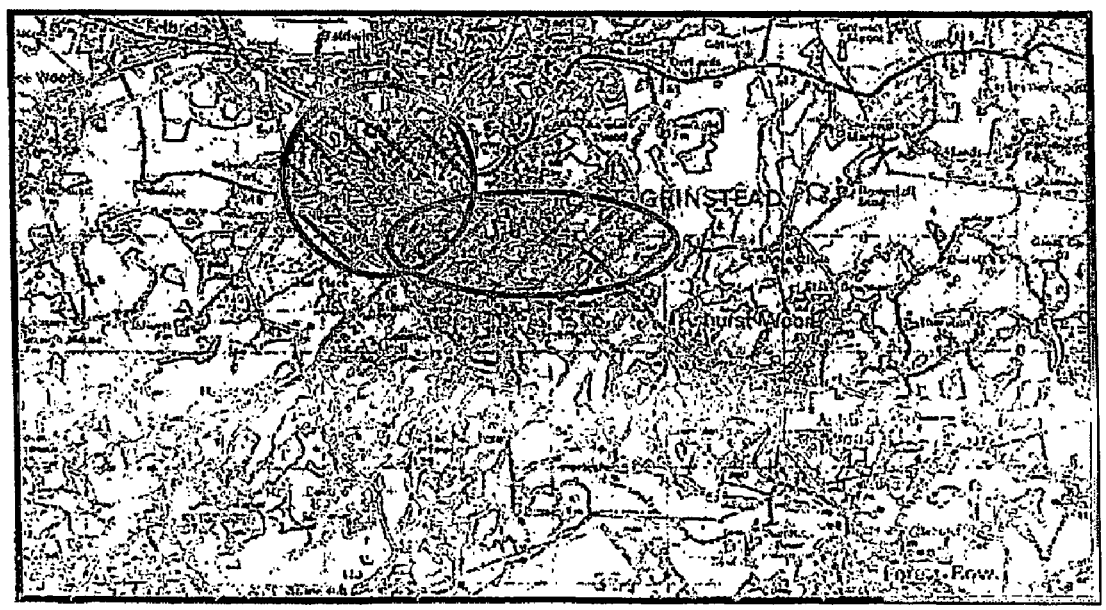

The present invention will now be described, by way of example only, with reference to the accompanying figures in which:

FIG. 1 shows, schematically, mobile cellular telephones MS1 and MS2 communicating together via respective nearby cellular telephone network base station BS1 and BS2;

FIGS. 2 to 4 show telephone displays generated in accordance with the present invention; and FIG. 1 shows mobile cellular telephones MS1 and MS2 in the possession of respective users (not shown) and registered with respective nearby cellular telephone network base stations BS1 and BS2 facilitating voice and data communication with that base station and corresponding cellular telephone network (not shown). Each mobile telephone comprises a GPS receiver (not shown). Mobile cellular telephones MS1 and MS2 operate in accordance with the present invention as illustrated in the following example scenarios:

EXAMPLE 1

Referring to FIG. 2, suppose the user of telephone MS1 instructs it to display the user's present location (i.e. that of telephone MS1) on a map. Typically, the most readily available estimate of such a location will be the cell area corresponding to the coverage of the base station BS1 in FIG. 2 with which telephone MS1 is registered (illustrated in by the diagonal, top left to bottom right hatching).

Thereafter, enhanced cell positioning is used to further limit the area in which mobile telephone MS1 is estimated to be located (illustrated by the diagonal, top right to bottom left hatching). Enhanced cell positioning typically involving measurements in respect of not only the base station BS1 with which telephone MS1 is registered but also other nearby base stations that can hear or transmit to telephone MS1.

Lastly, the GPS receiver of mobile telephone MS1 returns a position fix together with an estimate of error (illustrated by the horizontal hatching). Note, network based and GPS based cellular telephone positioning are well known and hence will not be described in any further detail.

All three hatched areas are displayed over the map with the most recent and most accurate position fix, i.e. the GPS fix, on top of the enhanced cell position fix which in turn is on top of the cell area position fix. By "on top", it is meant the hatching of one area replaces that of a previous area. As shown in FIG. 2, the boundaries of hatching are not obscured by hatching on top, but this need not be the case.

Shaded or dynamically highlighted areas, e.g. flashing, could be used as an alternative to hatching. Also, the manner in which each of the position fixes were obtained could be indicated by the colour of the highlight.

EXAMPLE 2

Referring to FIG. 3, as example 1 except that rather than display the hatched areas one on top of another, the hatching is merged. The density of hatching therefore directly relates the likely position of the mobile telephone MS1.

Were the areas highlighted by shading instead of hatching, the shading of the overlapping areas could be done by alpha blending. Even if the first and second were areas highlighted by the same colour of shading, the overlapping areas would appear darker, i.e. still distinguished from those parts of the areas which do not overlap.

EXAMPLE 3

Suppose the user of telephone MS1 instructs it to display the user's present location (i.e. that of telephone MS1) on a map together with the present location of a friend in possession of telephone MS2.

Mobile telephone MS1 polls telephone MS2 to request it return a position fix using its GPS receiver together with an estimate of position error which telephone MS2 does (illustrated in FIG. 4 by the diagonal, top left to bottom right hatching). Note, the exchange of positioning information between two mobile telephones is known.

Mobile telephone MS1 also determines a position fix using its GPS receiver together with an estimate of both longitude and latitude error (illustrated in FIG. 4 by the diagonal, top right to bottom left hatching of an elliptical shape where the major and minor axis are the longitude and latitude respectively). Note, the computation of GPS accuracy in longitude and latitude is known from at least Section 7.1.4 of GPS Principles and Applications (Editor, Kaplan) ISBN 0-89006-793-7 Artech House.

Both hatched areas are displayed over the map.

Implementation of a method according to the present invention in such a mobile telephone or indeed any other computer system having a display and a processor may be readily accomplished in hardware, in software (stored either in situ on a computer, on storage media or at a server for transmission to such a computer) or a combination of both. As is well known in the art, storage media is any storage medium, e.g., magnetic or optical, that may be accessed (read) by a computer including volatile or non-volatile storage media; and removable or fixed storage media. Of course, computer programming and/or computer hardware configuration is well known and would be accomplished by one of ordinary skill in the art without undue burden.

The invention claimed is:

1. A method of generating a map display for a graphical user interface presented on a display apparatus, the method comprising the steps of:

displaying on the display apparatus a map highlighting a first area on the map surrounding a first position fix wherein the size of the area corresponds to the accuracy of the first position fix; and highlighting a second area on the map surrounding a second position fix wherein the size of the second area corresponds to the accuracy of the second position fix, wherein, when the first and second areas overlap, the one corresponding to the most recent or accurate position fix is displayed on top of the other.

2. A method of generating a map display for a graphical user interface presented on a display apparatus, the method comprising the steps of:

displaying on the display apparatus a map highlighting a first area on the map surrounding a first position fix wherein the size of the area corresponds to the accuracy of the first position fix; and highlighting a second area on the map surrounding a second position fix wherein the size of the second area corresponds to the accuracy of the second position fix, wherein, when the first and second areas overlap, the highlighting of the overlapping area is different from that of those parts of the first and second areas which do not overlap.

3. A method of generating a map display for a graphical user interface presented on a display apparatus, the method comprising the steps of:

displaying on the display apparatus a map highlighting a first area on the map surrounding a first position fix wherein the size of the area corresponds to the accuracy of the first position fix; and highlighting a second area on the map surrounding a second position fix wherein the size of the second area corresponds to the accuracy of the second position fix, wherein the manner in which at least one of the position fixes is obtained is indicated by the colour of the highlight.

4. A machine-readable storage medium having recorded thereon data representing instructions for performing a method according to claim 1.

5. A server computer configured to transmit data representing instructions for performing a method according to claim 1.

6. Apparatus having a display and a processor configured to perform a method according to claim 1.

\* \* \* \* \*